(12) United States Patent
Zhu et al.

(10) Patent No.: US 6,922,221 B2
(45) Date of Patent: Jul. 26, 2005

(54) BROADBAND QUARTER-WAVE FILM DEVICE INCLUDING IN COMBINATION A CHROMATIC HALF-WAVE FILM AND A TN-LC POLYMERIC FILM

(75) Inventors: Xinyu Zhu, Orlando, FL (US); Shin-Tson Wu, Oviedo, FL (US)

(73) Assignees: Research Foundation of the University of Central Florida, Orlando, FL (US); Toppoly Optoelectronics Corp., Miao-Li (TW)

( * ) Notice: Subject to any disclaimer, the term of this patent is extended or adjusted under 35 U.S.C. 154(b) by 56 days.

(21) Appl. No.: 10/638,635

(22) Filed: Aug. 11, 2003

(65) Prior Publication Data

US 2004/0075797 A1 Apr. 22, 2004

Related U.S. Application Data

(60) Provisional application No. 60/419,181, filed on Oct. 17, 2002.

(51) Int. Cl.[7] .............................................. G02F 1/1335
(52) U.S. Cl. ........................................ 349/117; 349/96
(58) Field of Search ...................... 349/96, 98, 117–120

(56) References Cited

U.S. PATENT DOCUMENTS

| | | | | |
|---|---|---|---|---|
| 6,028,656 | A | * 2/2000 | Buhrer et al. | ................ 349/196 |
| 6,710,831 | B1 | * 3/2004 | Winker et al. | ............... 349/115 |
| 6,765,635 | B1 | * 7/2004 | Kelly et al. | ..................... 349/76 |
| 6,795,149 | B2 | * 9/2004 | Vogels et al. | ................ 349/117 |

OTHER PUBLICATIONS

Jian et al., (Retardation–film–compensated reflective bistable twisted nematic liquid crystal displays, Applied Optics, Jul. 1st, 2003, vol. 42, No. 19.*

Wu et al., "Design Optimization of Broadband Linear Polarziation Converter Using Twisted Nematic Liquid Crystal", University of Central Florida, Nov. 19, 2002.☐☐.*

Yoon et al., "Nontwist quarter–wave liquid crystal cell for a high–contrast reflective display", Optical Society of America, Jul. 1, 2000.*

S. Pancharatnam, Achromatic Combinations of Birefringent Plates, Memoir No. 71 of Raman Research Institute, Bangalore, Mar. 5, 1955, pp 130–136.

Tae–Hoon Yoon, et al., Nontwist quarter–wave liquid–crystal cell for a high–contrast reflective Display, 2000 Optical Society of America, Oct. 15, 2000, vol. 25, No. 20, Optics Letters, pp 1547–1549.

* cited by examiner

*Primary Examiner*—Tarifur R. Chowdhury
(74) *Attorney, Agent, or Firm*—Joyce P. Morlin; Brian S. Steinberger; Law Offices of Brian S. Steinberger, P.A.

(57) ABSTRACT

A quarter-wave film having a wide bandwidth is invented. A preferred device configuration includes a chromatic half-wave film adjacent to a twisted nematic liquid crystal (TN-LC) film. When a linear polarizer is attached to the side of chromatic half-wave film and the angles of all the optical components are properly set, the combination of chromatic half-wave film and TN-LC film behaves as a broadband quarter-wave film. Based on this idea, a broadband circular polarizer is invented if the linear polarizer, the chromatic half-wave film and the TN-LC film are combined together. In addition, this idea can also be applied to reflective liquid crystal display devices, which include a linear polarizer, a chromatic half-wave film, a TN-LC cell and a reflector.

7 Claims, 11 Drawing Sheets

BROADBAND QUARTER-WAVE FILM DEVICE INCLUDING IN COMBINATION A CHROMATIC HALF-WAVE FILM AND A TN-LC POLYMERIC FILM

This invention claims the benefit of priority to U.S. Provisional patent application 60/419,181 filed Oct. 17, 2002.

FIELD OF THE INVENTION

This invention relates to quarter-wave films, in particular to methods and devices for widening the bandwidth of a quarter-wave film.

BACKGROUND AND PRIOR ART

Reflective and transflective liquid crystal displays (LCDs) have been widely used in personal information display for its low power consumption and light weight. In most reflective and transflective direct-view display devices, a broadband quarter-wave retardation film is needed in order to obtain a good dark state. As shown in FIG. 1, the conventional broadband quarter-wave film laminates a chromatic half-wave film and a chromatic quarter-wave film at specific angles. See for example, S. Pancharatnam, *Proceedings of the Indian Academy of Science*, Section A, Vol. 41, p.130, (1955); and T. H Yoon, G. D. Lee and J. C. Kim, *Opt. Lett.*, Vol.25(20), p. 1547, (2000). The fabrication processes of the prior art are relatively simple, however, its spectral bandwidth is insufficient.

There is a need to improve broadband technology to meet the intended purpose of making displays and delivery of personal information more effective. The broadband quarter-wave film of the present invention can be used in personal information tools and would further increase the contrast ratio and also serve as a reflective LCD when the twisted film is replaced by a liquid crystal cell.

SUMMARY OF THE INVENTION

The first objective of the present invention is to provide a quarter-wave film and method of forming a quarter-wave film having a wide bandwidth.

The second objective of the present invention is to provide a reflective liquid crystal display (LCD) using a chromatic half-wave film.

The third objective of the present invention is to provide a broadband circular polarizer comprising a linear polarizer, a chromatic half-wave film, and a twisted nematic liquid crystal (TN-LC).

The fourth objective of the present invention is to provide a broadband quarter-wave film that improves the functioning and results of personal information displays and tools.

Further objects and advantages of this invention will be apparent from the following detailed description of the presently preferred embodiments, which are illustrated, schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Figure 1:
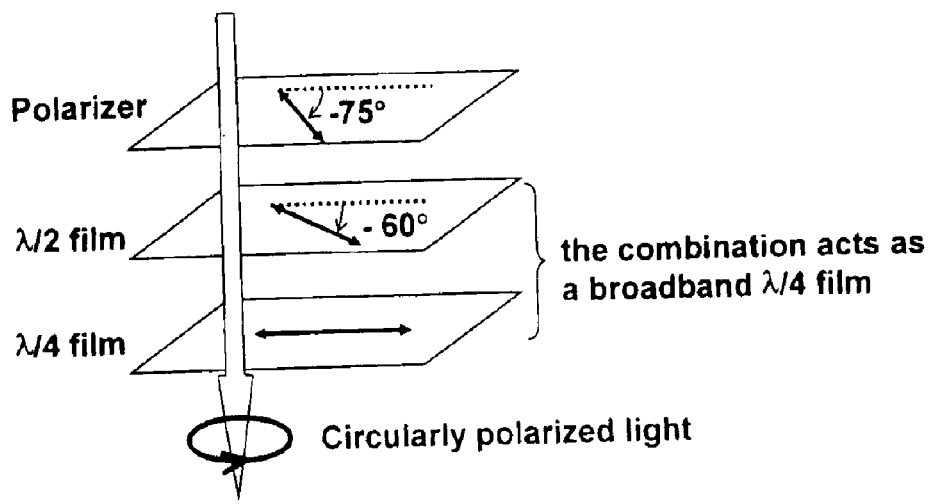
FIG. 1 shows a prior art broadband quarter-wave film.

A preferred embodiment of the subject invention encompasses an improved quarter-wave film exhibiting a much wider bandwidth than that of the prior art depicted in FIG. 1.

The quarter-wave film device of the present invention can be a quarter-wave film with a broadband wavelength, a broadband circular polarizer or when appropriately modified, a reflective liquid crystal display (LCD).

One embodiment of the novel quarter-wave film device that functions with a broadband wavelength is a combination of a chromatic half-wave film and a twisted nematic liquid crystal (TN-LC) polymeric film.

A second embodiment of the novel quarter-wave film device that functions as a broadband circular polarizer is a combination of a linear polarizer, a chromatic half-wave film, and a TN-LC polymeric film.

The first and second embodiments described above can be fabricated by having one side of the TN-LC film laminated to one side of the chromatic half-wave film, and when a linear polarizer is laminated to the other side of the chromatic half-wave film, the combination of chromatic half-wave film and TN-LC film forms a quarter-wave film with a broadband wavelength. The twist sense of the TN-LC film can be left-handed or right-handed. The twist angle is larger than 0 degree and less than approximately 80 degrees. Retardation (dΔn) values of the TN-LC film are in a range that is larger than approximately 0.1λ and less than approximately 1.0λ.

When the twist sense of the TN-LC film is left-handed, the twist angle of 4θ−2β is larger than approximately −90°+m×180° and less that approximately 0°+m×180°, wherein θ is the angle between optical axis of chromatic half-wave film and top liquid crystal director, β is the angle between transmission axis of linear polarizer and top liquid crystal director, and m is an integer.

When the twist sense of the TN-LC film is right-handed, the twist angle of 4θ−2β is larger than approximately 0°+m×180° and less than approximately 90°+m×180°, wherein θ is the angle between optical axis of chromatic half-wave film and top liquid crystal director, β is the angle between transmission axis of linear polarizer and top liquid crystal director, and m is an integer.

A third embodiment of the novel quarter-wave film device functions as a reflective liquid crystal display (LCD) and combines a polarizer, a chromatic half-wave film, a first substrate and a second substrate, a TN-LC layer, and a reflector. The reflector can be implemented at the inner side or at the outer side of the second substrate. The polarizer means is laminated to one side of the chromatic half-wave film, and one side of the TN-LC cell is laminated to the other side of the chromatic half-wave film, and the reflector is coated either inner or outer side of the TN-LC cell.

The twist angle of the TN-LC layer is larger than approximately 0 degrees and less than approximately 80 degrees, and the twist sense can be left-handed or right-handed, in the reflective liquid crystal display device.

The retardation (dΔn) values and angle measurements for the angle of 4θ−2β for the reflective LCD device are the same as for embodiments one and two above.

Figure 2:
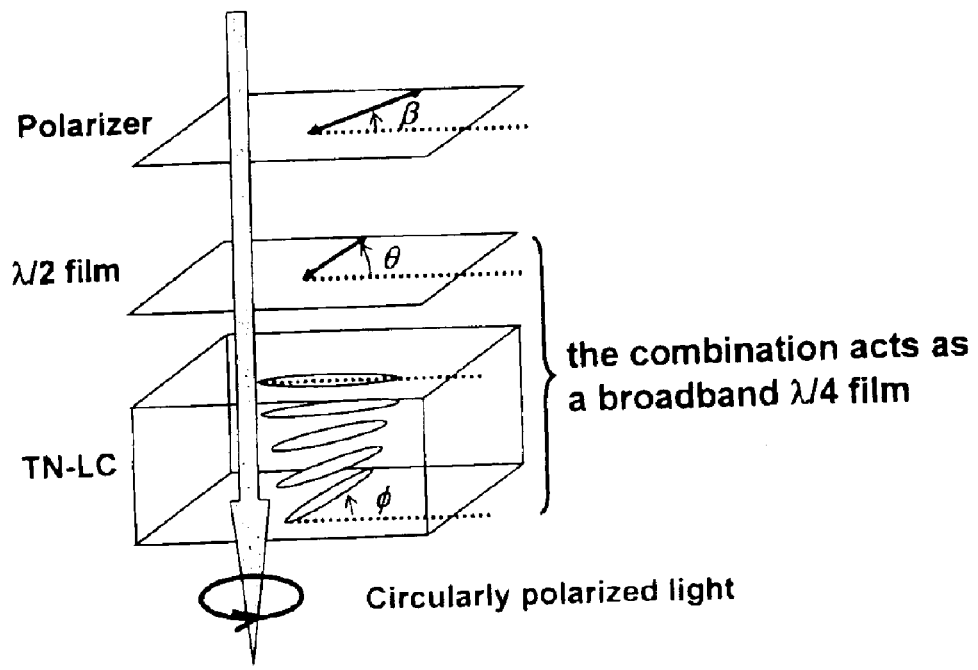
FIG. 2 shows a perspective view of a preferred embodiment of the novel broadband quarter-wave film of the present invention.

FIG. 2 illuminates the design of the present invention. The basic components of the broadband quarter-wave film device of the present invention consist of a chromatic half-wave film and a twisted-nematic liquid crystal polymeric film at specific angles.

Figure 3:
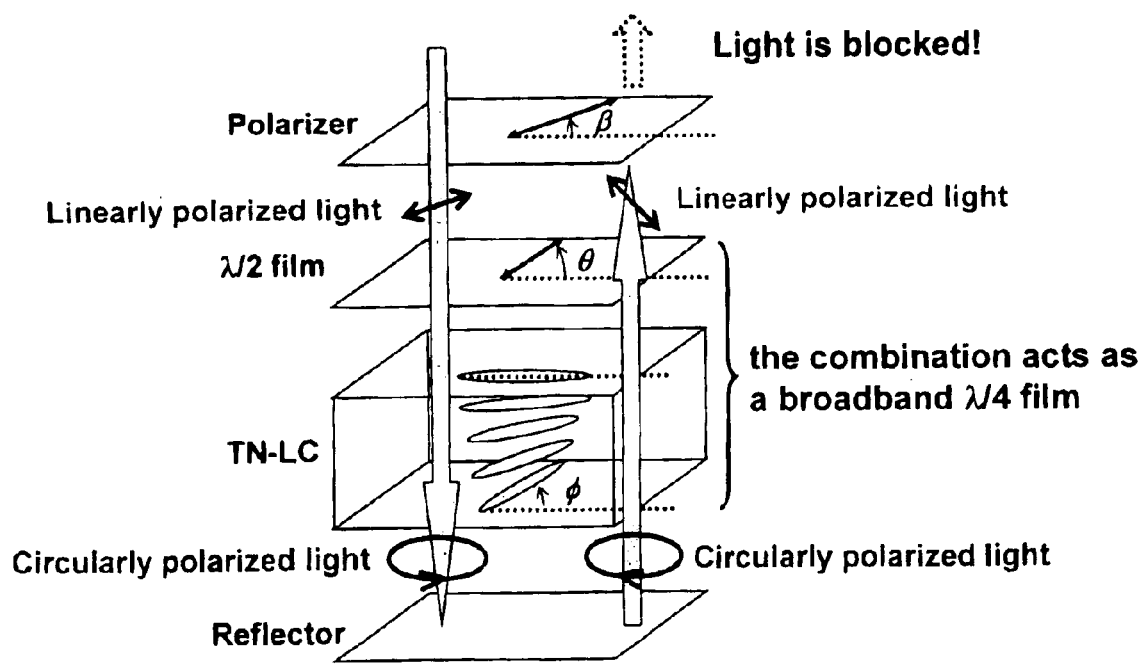
FIG. 3 shows the configuration to verify the broadband quarter-wave film conditions in the present invention.

In FIG. 3, a reflector is added below the TN-LC film to verify that the combination of a chromatic half-wave film and a TN-LC film functions as a broadband quarter-wave film. As shown in FIG. 3, after passing through the polarizer, the unpolarized incident light becomes linearly polarized. When these optical components are properly arranged, the linearly polarized light, after passing through the chromatic half-wave film and the TN-LC film, becomes circularly polarized. This circularly polarized light is then reflected back by the reflector. The reflected light passes through the TN-LC film and chromatic half-wave film the second time and becomes linearly polarized with its axis orthogonal to the polarizer. As a result, the light is blocked by the polarizer resulting in a dark state. That means the combined half-wave film and the TN LC film functions as a quarter-wave film.

According to the configuration shown in FIG. 3, the normalized reflectance R is obtained using Jones matrix method:

$$R = \left| (\cos\beta \ \sin\beta) \cdot M_{Film} \cdot M_{LC}^{ref} \cdot M_{LC}^{in} \cdot M_{Film} \cdot \begin{pmatrix} \cos\beta \\ \sin\beta \end{pmatrix} \right|^2 \quad (1)$$

where $M_{Film}$ is the Jones matrix of the half-wave film and $M_{LC}^{ref}$ and $M_{LC}^{in}$ are the Jones matrices of the TN-LC for the reflected light and the incident light, respectively. And β is the angle between the polarizer and the top LC director.

At the central wavelength $\lambda_0$, the phase retardation of the chromatic half-wave film is π and hence the normalized reflectance is:

$$R = \left[ 2\left(\frac{\Gamma}{2} \cdot \frac{\sin X}{X}\right)^2 - 1 \right]^2 + \left\{ \Gamma \cdot \frac{\sin X}{X} \left[ \cos X \cos(4\theta - 2\beta) + \phi \frac{\sin X}{X} \sin(4\theta - 2\beta) \right] \right\}^2 \quad (2)$$

where $\Gamma = 2\pi d\Delta n/\lambda_0$, $X = \sqrt{\phi^2 + (\Gamma/2)^2}$; d is thickness of TN-LC layer, birefringence of liquid crystal material, φ is twist angle of TN-LC layer. To make the combined chromatic half-wave film and TN-LC film in FIG. 3 function as a quarter-wave film, the normalized reflectance in equation (Eq.)(2) is set to 0. Under such circumstance, the relationship between 4θ−2β, φ and dΔn/λ_0 is obtained, as shown in FIG. 4. From FIG. 4, for a given 4θ−2β, it is possible to find a group of parameters (φ, dΔn/λ_0) of the TN-LC film to satisfy R=0. That means a group of parameters (φ, dΔn/λ_0) of the TN-LC film can always be found to make the combined chromatic half-wave film and TN-LC film in FIG. 3 function as a quarter-wave film.

Figure 5:
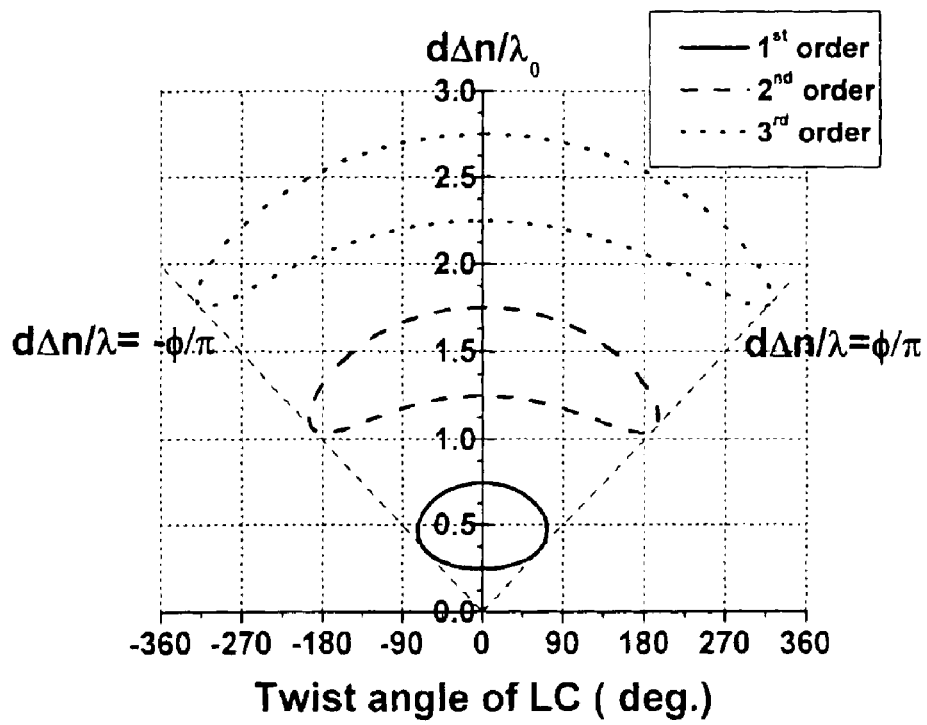
FIG. 5 shows the twist angles and retardation values of the TN-LC films that satisfy the quarter-wave film conditions.

It should be noted that there are first order and higher order quarter-wave films. FIG. 5 shows the twist angles and retardation values of the TN-LC films that satisfy the first, the second and the third order conditions. However, the second and the third order conditions are not suitable for broadband quarter-wave retardation films since they have larger color dispersion. Therefore, the design of the first order broadband quarter-wave film is a priority.

Figure 6:
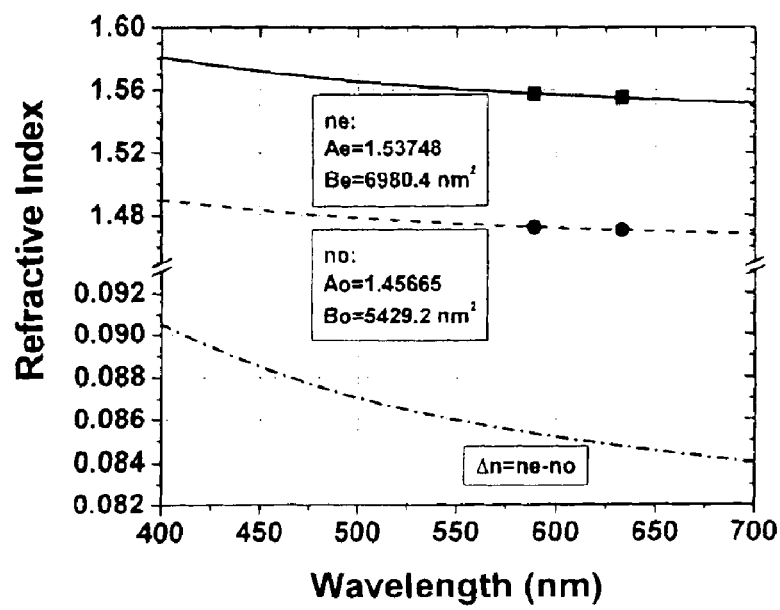
FIG. 6 shows the wavelength-dependent refractive indices and birefringence of MLC 9100-000. Squares and circles are experimental results at T=23° C. and the lines are fitting results using Cauchy formula.

In order to realize broadband quarter-wave retardation condition, it is necessary to properly set the direction of the optical axis of the chromatic half-wave film with respect to the polarizer. Since the properties of a broadband quarter-wave film depends on the material color dispersion, the liquid crystal material chosen is MLC9100-000 (from Merck& Co., Inc.); it is assumed that the color dispersion of the chromatic half-wave film matches that of the LC material employed. The wavelength dependent refractive indices are approximated by Cauchy formula:

$$n_{e,o} = A_{e,o} + \frac{B_{e,o}}{\lambda^2} \quad (3)$$

where the subscripts denote the extraordinary (e) and ordinary (o) rays, respectively. FIG. 6 shows the wavelength dependent refractive indices of MLC 9100-000 at T~23° C.; these parameters are used in the following simulations.

Figure 7A:
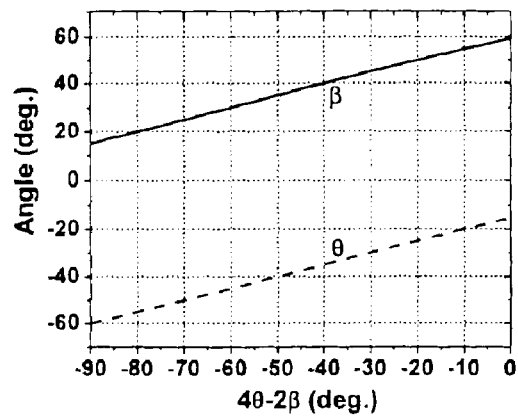
FIG. 7a is a graph of the angles of chromatic half-wave film and polarizer that satisfy the broadband quarter-wave retardation film conditions for positive twist (i.e., left handedness) TN-LC. This configuration forms a broadband right-handed circular polarizer.
Figure 7B:
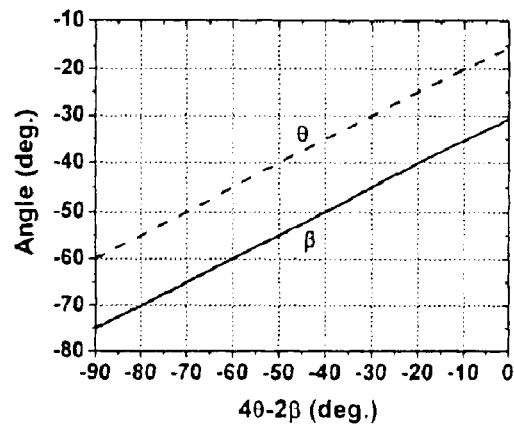
FIG. 7b is a graph of the angles of chromatic half-wave film and polarizer that satisfy the broadband quarter-wave retardation film conditions for positive twist (i.e., left handedness) TN-LC. This configuration forms a broadband left-handed circular polarizer.
Figure 7C:
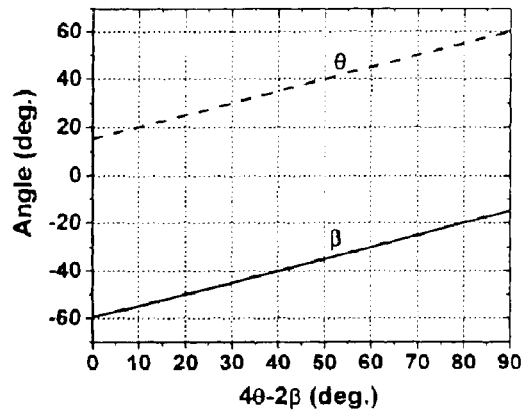
FIG. 7c is a graph of the angles of chromatic half-wave film and polarizer that satisfy the broadband quarter-wave retardation film conditions for negative twist (i.e., right handedness) TN-LC. This configuration forms a broadband left-handed circular polarizer.
Figure 7D:
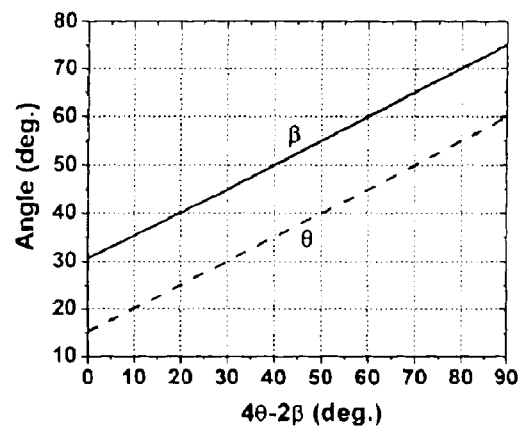
FIG. 7d is a graph of the angles of chromatic half-wave film and polarizer that satisfy the broadband quarter-wave retardation film conditions for negative twist (i.e., right handedness) TN-LC. This configuration forms a broadband right-handed circular polarizer.

After taking the material color dispersion into consideration, the angles between the chromatic half-wave film and the linear polarizer are obtained and this satisfies the broadband quarter-wave film condition. Results are shown in FIG. 7. FIGS. 7a and 7b are the cases of positive twist (left-handedness) TN-LC, while FIGS. 7c and 7d are the cases of negative twist (right-handedness) TN-LC. In fact, the two conditions with 4θ−2β=−90° as plotted in FIGS. 7a and 7b, and the two conditions with 4θ−2β=90° as plotted in FIGS. 7c, 7d are exactly the cases for the above-mentioned prior art, where the twist angle φ=0° and phase retardation dΔn/λ=0.25.

As long as the twist angle (φ) of the TN-LC layer is non-zero, the combination of the chromatic half-wave film and the TN-LC film is equivalent to a quarter-wave film at two different wavelengths. Therefore, the central wavelength $\lambda_0$ is adjusted to get the desired bandwidth. For LCD applications, the peaks of the three primary colors occur at 460 nm, 550 nm and 630 nm wavelengths. To obtain a balanced white, the ratio of green/red/blue should be close to 60/30/10.

Figure 4A:
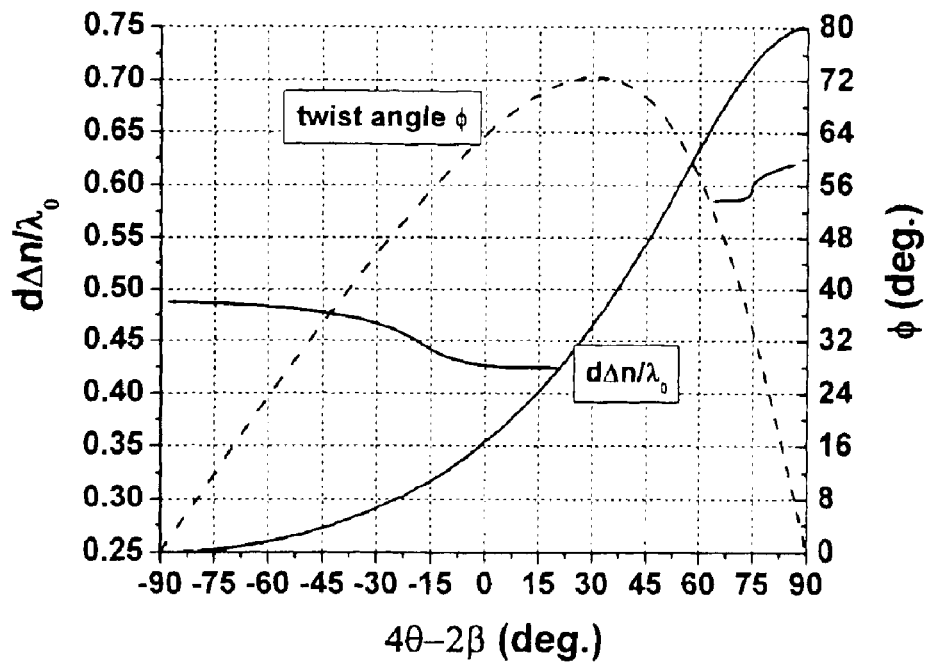
FIG. 4a is a graph of the relationship between $4\theta-2\beta$, $\phi$ and $d\Delta n/\lambda_0$ to make Eq.(2) equal to 0 with a positive twist angle (i.e., left handedness).
Figure 4B:
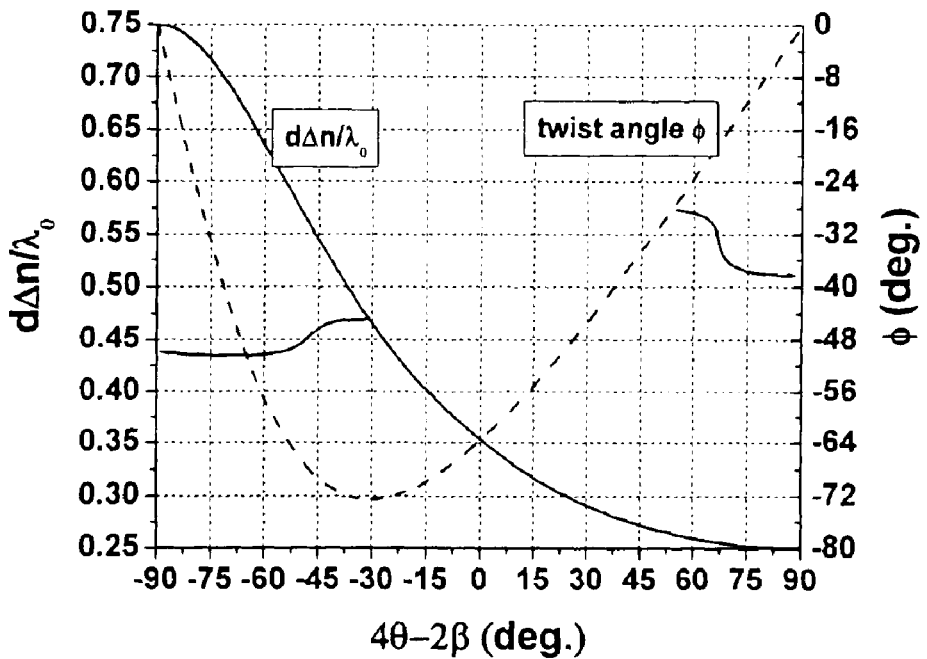
FIG. 4b is a graph of the relationship between $4\theta-2\beta$, $\phi$ and $d\Delta n/\lambda_0$ to make Eq.(2) equal to 0 with a negative twist angle (i.e., right handedness).
Figure 8:
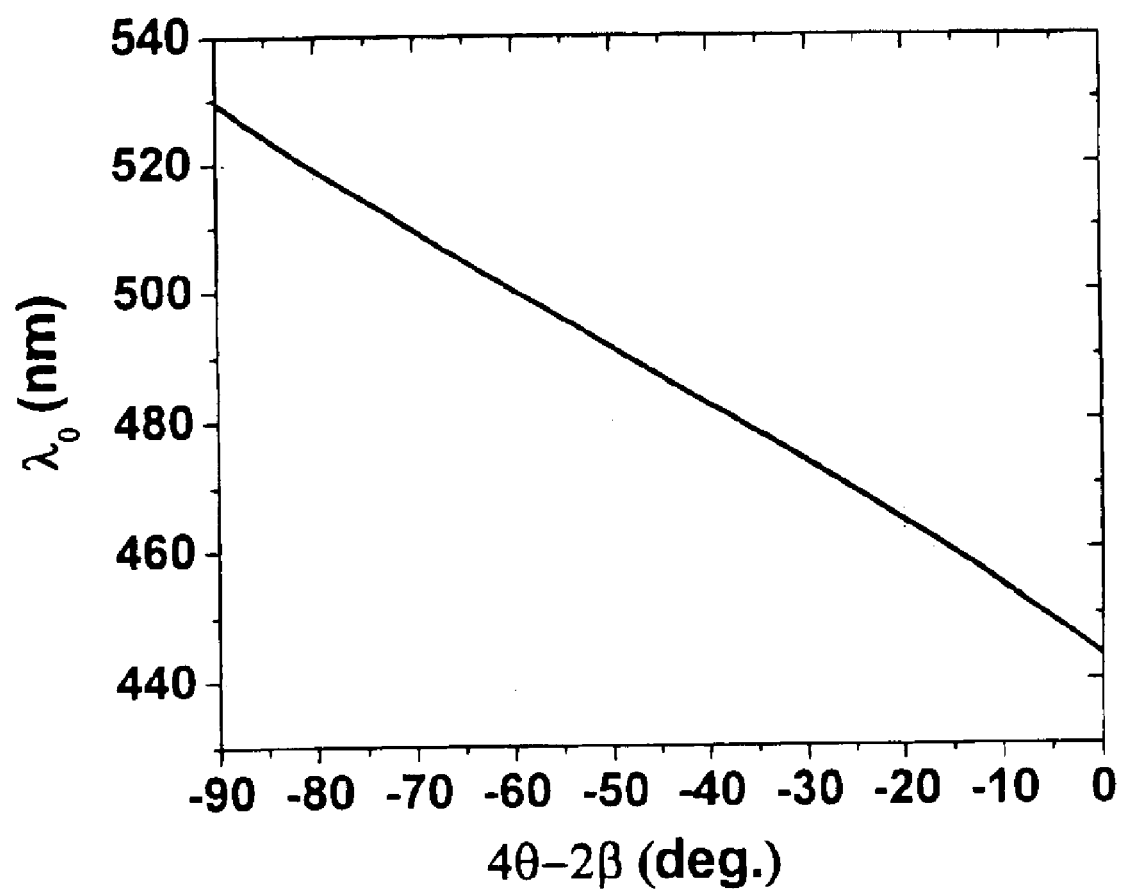
FIG. 8 shows a graph of the relationship between central wavelength $\lambda_0$ and $4\theta-2\beta$.

FIG. 8 shows the central wavelength $\lambda_0$ selection for different 4θ−2β. This central wavelength selection is also dependent on the color dispersion of chromatic half-wave film and TN-LC film. The variation of central wavelength means changing the thickness of chromatic half-wave film and TN-LC film. It should be pointed out here that each 4θ−2β has a corresponding set of φ and dΔn/$\lambda_0$ as shown in FIGS. 4a and 4b and a corresponding set of θ and β as shown in FIGS. 7a, 7b, 7c and 7d. For instance, if 4θ−2β=−30° is choosen from FIG. 7a, then θ=−30° and β=45° are found. Note that although the calculated 4θ−2β is actually −210°, it is equivalent to −30° because of the 180° periodicity of 4θ−2β in Eq. (2). In FIG. 4a, the LC twist angle is φ~45° and retardation (dΔn) value ~0.29$\lambda_0$.

Figure 9:
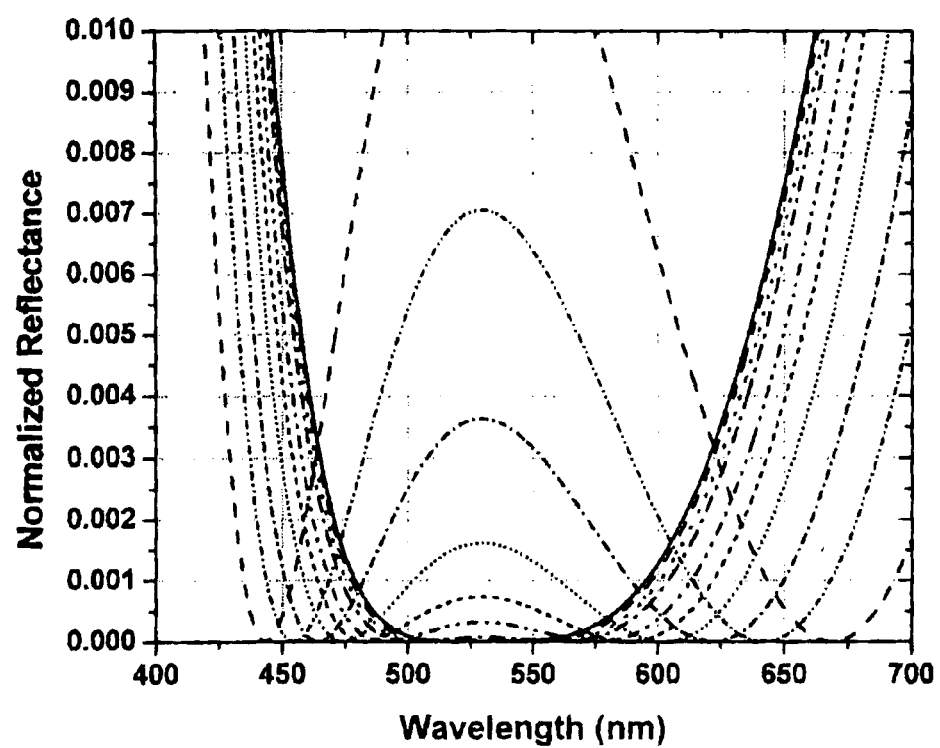
FIG. 9 shows the spectrum of normalized reflectance. The lines from solid to dash denote the cases of different $4\theta-2\beta$, from $-90°$ to $0°$ with a step increment of $10°$. The solid line represents the result of the prior art.

The normalized reflectance spectrum of the structure shown in FIG. 3 is plotted in FIG. 9, which shows that with the increase of 4θ−2β from −90° to 0°, the two wavelengths at which normalized reflectance equals to 0 are separated farther and farther. Here the solid line represents the prior art. Only one wavelength exists at which normalized reflectance is 0. However, in the present invention with non-zero twist angle, there exist two different wavelengths at which the normalized reflectance is 0.

Figure 10:
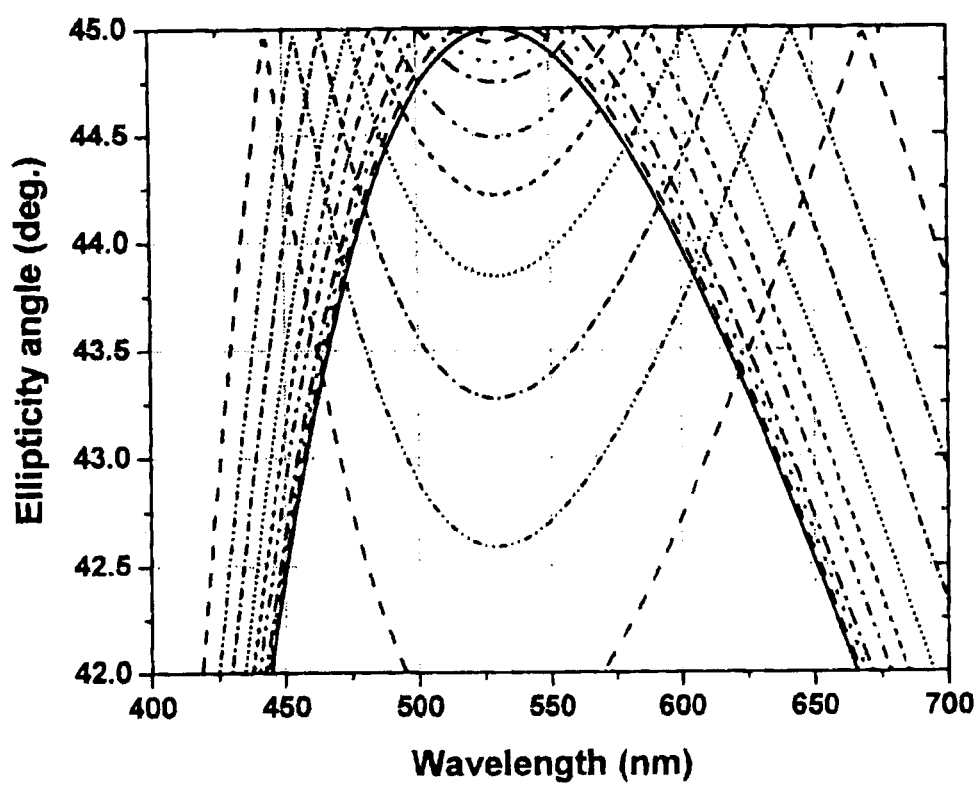
FIG. 10 shows the ellipticity angle of this invention. The lines from solid to dash denote the cases of different $4\theta-2\beta$, from $-90°$ to $0°$ with a step increment of $10°$. The solid line represents the result of the prior art.

FIG. 10 shows the ellipticity angle of the present invention. In the prior art, when twist angle is 0°, there is only one wavelength at which the ellipticity angle is 45°, while in the present invention with non-zero twist angle, there are two different wavelengths at which the ellipticity angle is 45°. Therefore, the present invention exhibits a wider bandwidth than the prior art.

Figure 11A:
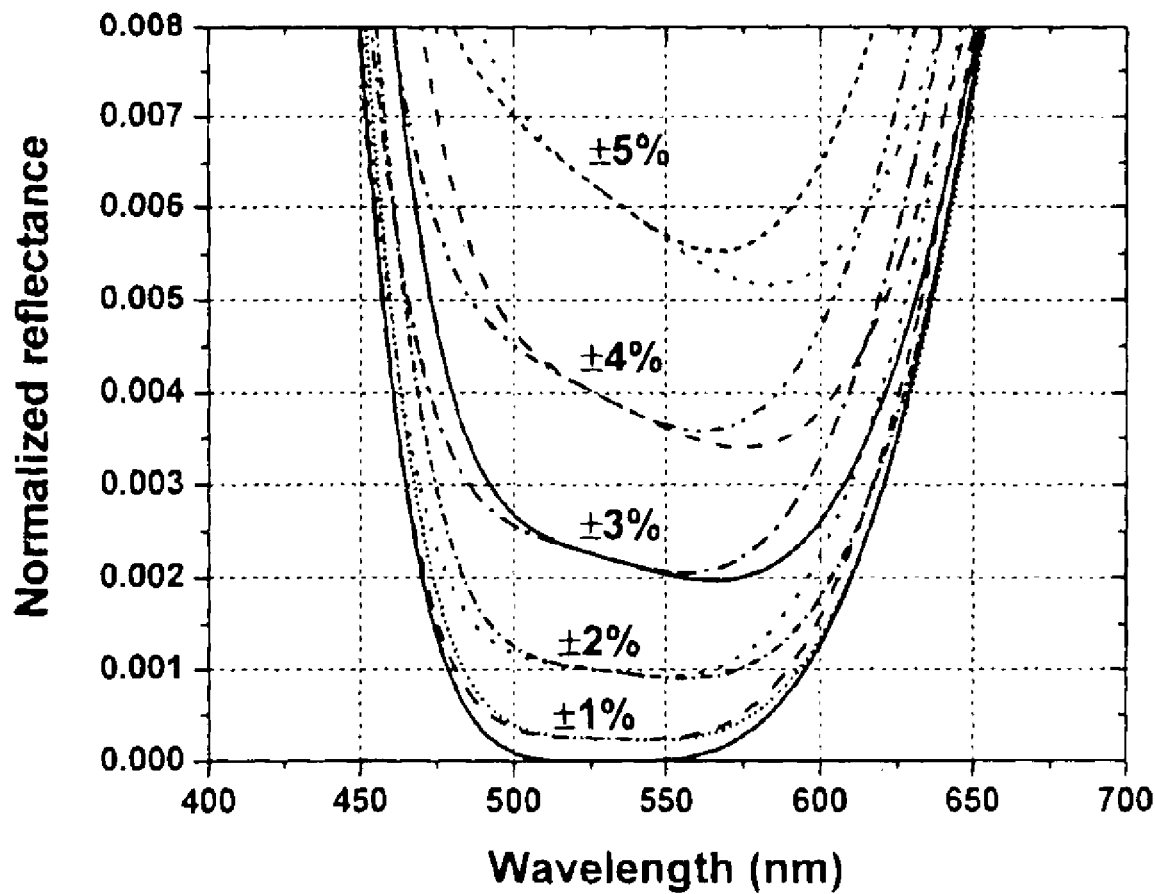
FIG. 11a shows the effect of film thickness error on normalized reflectance for prior art.
Figure 11B:
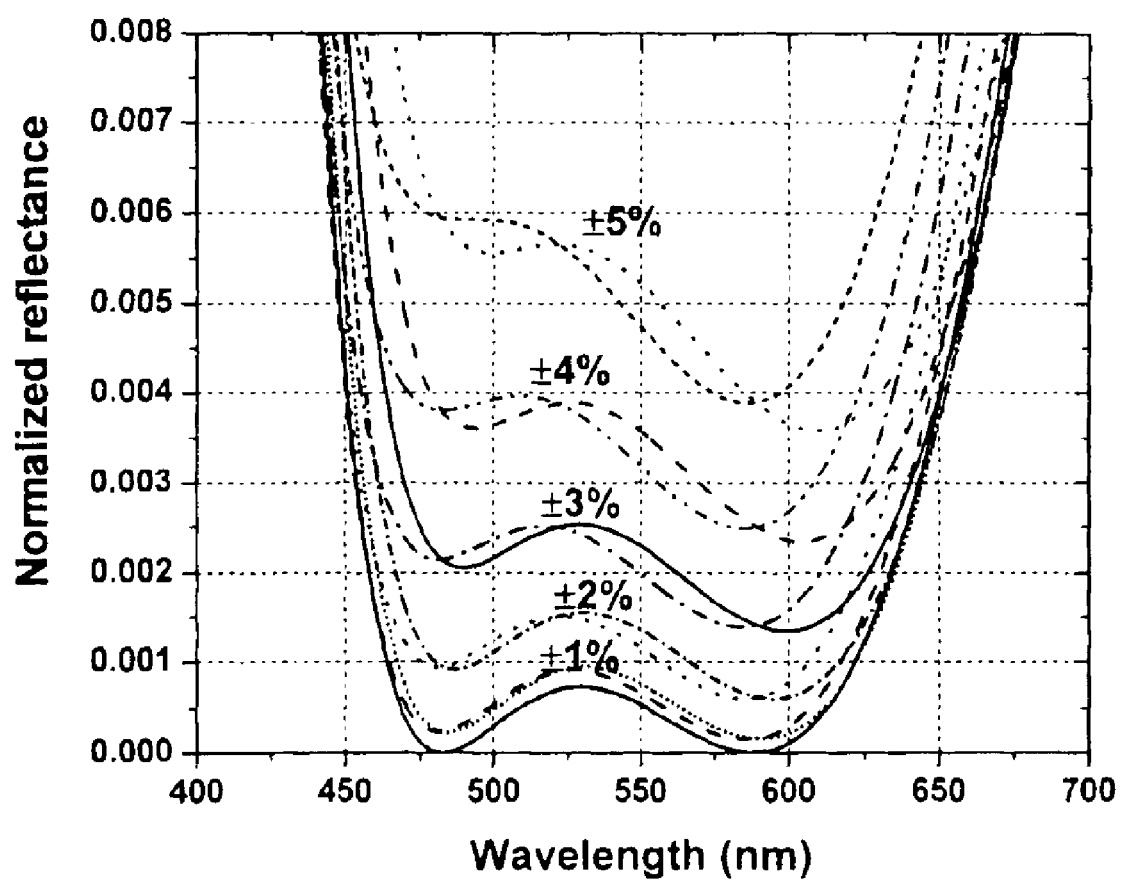
FIG. 11b shows the effect of film thickness error on normalized reflectance for one embodiment of this invention at $4\theta-2\beta=-40°$, $d\Delta n/\lambda_0=0.278$, $\phi=38.3°$, $\beta=-50°$, and $\theta=-35°$.

The film thickness tolerance is an important factor affecting manufacturing yield. FIGS. 11a and 11b plot the effect of the TN-LC film thickness tolerance on the normalized reflectance for the prior art and present invention, respectively. From FIG. 11a, the prior art has a better dark state in the green band, but a narrower bandwidth if the film thickness is within ±1% of the optimal value. Beyond 2%, the present invention results are compatible with the prior art; however, the bandwidth of the present invention is wider.

Figure 12:
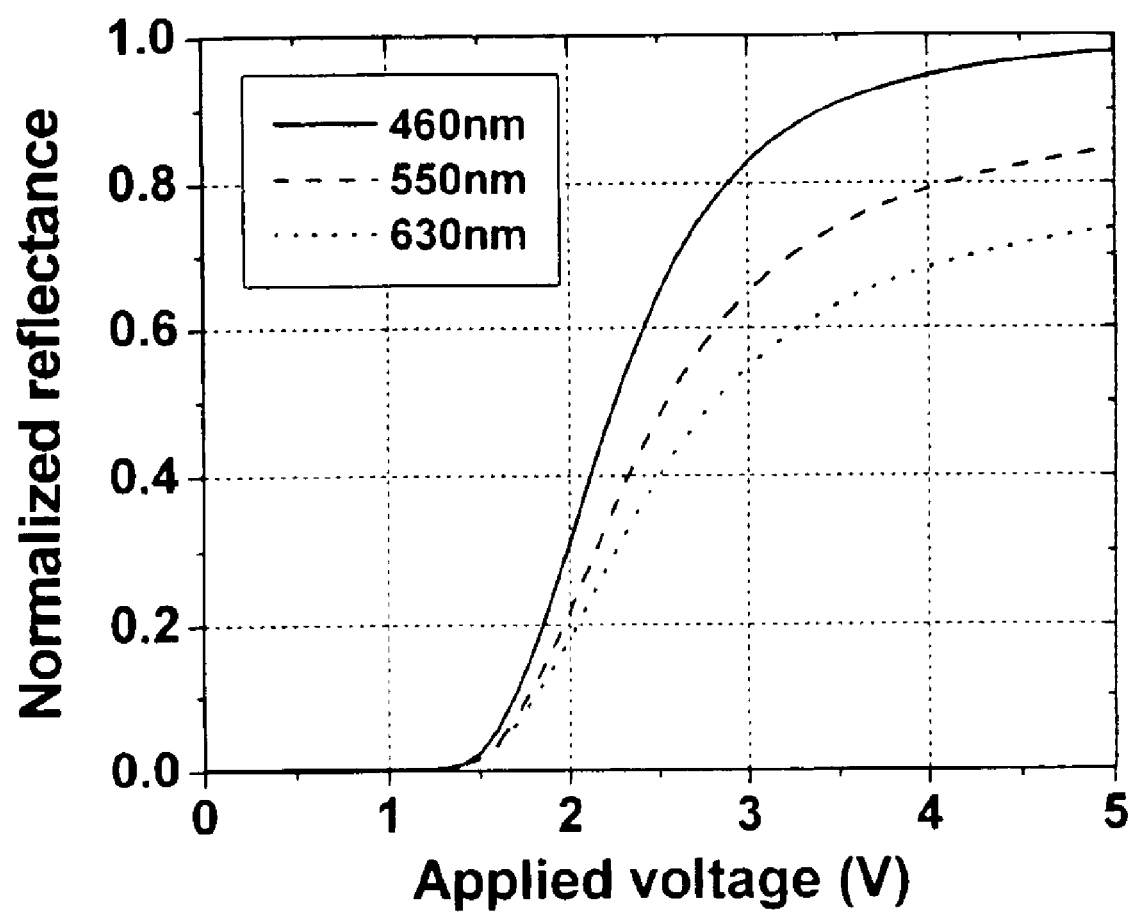
FIG. 12 shows the electro-optical curve of a reflective LCD incorporating the present invention, d=1.54 µm, $\phi=38.3°$, $\beta=-50°$ and $\theta=-35°$.

In addition to the broadband quarter-wave film, the present invention can also be used as a reflective LCD. The principle is similar to that shown in FIG. 3 except replacing the TN-LC film by a TN-LC cell. Such a display is a normally black mode. When no voltage is applied to the cell, a broadband dark state is achieved. When a voltage is applied to the TN-LC cell, the liquid crystal is reoriented perpendicularly to the substrates and hence a white state is obtained. FIG. 12 shows the voltage-dependent reflectance curve of a reflective LCD incorporating this invention. The parameters used are d=1.54 μm, φ=38.3°, β=−50° and θ=−35°.

The major difference between the reflective display of the present invention and the prior art is that a half-wave film rather than a quarter-wave film is employed. The twist angle of the LC cell is φ=38.3° and retardation, dΔn=132.4 nm.

The major advantages of the present invention over the prior art is the wider bandwidth and better thickness tolerance The wider bandwidth improves the contrast ratio of a reflective display while a larger film thickness tolerance improves the manufacturing yield.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A quarter-wave film device, comprising in combination:

a chromatic half-wave film; and a twisted nematic liquid crystal (TN-LC) polymeric film, wherein the combination of chromatic half-wave film and the TN-LC film forms a quarter-wave film with a broadband wavelength.

2. A quarter-wave film device according to claim 1, wherein one side of the TN-LC film is laminated to one side of the chromatic half-wave film, and when a linear polarizer is laminated to the other side of the chromatic half-wave film, the combination of chromatic half-wave film and the TN-LC film forms a quarter-wave film with a broadband wavelength.

3. A quarter-wave film device according to claim 1, wherein the twist angle of TN-LC film is larger than 0 degree and less than approximately 80 degrees.

4. A quarter-wave film device according to claim 1, wherein the twist sense of TN-LC film can be left-handedness and right handedness.

5. A quarter-wave film device according to claim 1, wherein the TN-LC film has retardation (dΔn) values in a range that is larger than approximately 0.1λ and less than approximately 1.0λ, where λ is the wavelength of light.

6. A quarter-wave film device according to claim 1, wherein the angle of 4θ−2β is larger than approximately −90°+m×180° and less than approximately 0°+m×180° for left-handedness TN-LC film, wherein θ is the angle between optical axis of chromatic half-wave film and top liquid crystal director, β is the angle between transmission axis of linear polarizer and top liquid crystal director, and m is an integer.

7. A quarter-wave film device according to claim 1, wherein the angle of 4θ−2β is larger than approximately 0°+m×180° and less than approximately 90°+m×180° for right-handedness TN-LC film, wherein θ is the angle between optical axis of chromatic half-wave film and top liquid crystal director, β is the angle between transmission axis of linear polarizer and top liquid crystal director, and m is an integer.

* * * * *